(12) United States Patent
Guichard et al.

(10) Patent No.: US 9,579,828 B2
(45) Date of Patent: Feb. 28, 2017

(54) DEVICE FOR ADJUSTING THE QUALITY FACTOR OF A MOLD WITH A SELF-CONTAINED INDUCTION HEATING SYSTEM

(75) Inventors: Alexandre Guichard, La Chapelle du mont du Chat (FR); Jose Feigenblum, Saint-Paul (FR)

(73) Assignee: ROCTOOL, Le Bourget du Lac (FR)

( * ) Notice: Subject to any disclaimer, the term of this patent is extended or adjusted under 35 U.S.C. 154(b) by 128 days.

(21) Appl. No.: 14/237,584

(22) PCT Filed: Aug. 10, 2012

(86) PCT No.: PCT/EP2012/065734
§ 371 (c)(1),
(2), (4) Date: Feb. 7, 2014

(87) PCT Pub. No.: WO2013/021055
PCT Pub. Date: Feb. 14, 2013

(65) Prior Publication Data
US 2014/0183178 A1    Jul. 3, 2014

(30) Foreign Application Priority Data

Aug. 10, 2011   (FR) ..................................... 11 57289

(51) Int. Cl.
| | |
|---|---|
| *B29C 33/02* | (2006.01) |
| *H05B 6/06* | (2006.01) |
| *H05B 6/10* | (2006.01) |
| *H05B 6/14* | (2006.01) |
| *B29C 33/06* | (2006.01) |
| *B29C 35/08* | (2006.01) |

(52) U.S. Cl.
CPC .............. *B29C 33/02* (2013.01); *B29C 33/06* (2013.01); *H05B 6/06* (2013.01); *H05B 6/105* (2013.01); *H05B 6/14* (2013.01); *B29C 2035/0811* (2013.01)

(58) Field of Classification Search
CPC combination set(s) only.
See application file for complete search history.

(56) References Cited

U.S. PATENT DOCUMENTS

| | | | |
|---|---|---|---|
| 1,948,704 A | 2/1934 | Wilhelm | |
| 3,153,132 A | 10/1964 | Greene | |
| 5,483,043 A * | 1/1996 | Sturman, Jr. ........... | B29C 35/08 219/634 |

(Continued)

FOREIGN PATENT DOCUMENTS

WO    2006/136743 A1    12/2006

*Primary Examiner* — Dana Ross
*Assistant Examiner* — Renee Larose
(74) *Attorney, Agent, or Firm* — Im IP Law; C. Andrew Im

(57) ABSTRACT

A mold with a self-contained heating device comprising a mold body, a connector and an adjustment coil. The mold body comprises comprising an induction heating or tooling circuit having a resistance R1 and an inductance L1. The tooling circuit comprises an inductor extending inside a closed cavity of the mold body. The connector connects the tooling circuit to a high-frequency current generator. The adjustment coil has a resistance R2 and an inductance L2 that does not induce current in the mold body. The adjustment coil is connected to the tooling circuit, between the tooling circuit and the connector.

7 Claims, 2 Drawing Sheets

(56) References Cited

U.S. PATENT DOCUMENTS

| | | | | | |
|---|---|---|---|---|---|
| 5,571,436 | A | * | 11/1996 | Gregg | B21D 26/055 219/600 |
| 6,864,419 | B2 | * | 3/2005 | Lovens | H05K 9/0071 174/350 |
| 6,884,966 | B2 | * | 4/2005 | Coleman | B21D 26/055 148/698 |
| 8,372,327 | B2 | * | 2/2013 | Matsen | B29C 33/06 264/258 |
| 2002/0003011 | A1 | * | 1/2002 | Dykstra | A61F 13/15203 148/520 |
| 2004/0222566 | A1 | * | 11/2004 | Park | B29C 33/06 264/338 |
| 2004/0256382 | A1 | * | 12/2004 | Pilavdzic | B29C 45/74 219/601 |
| 2005/0035115 | A1 | * | 2/2005 | Anderson | B29C 33/04 219/759 |
| 2007/0267405 | A1 | * | 11/2007 | Feigen-Blum | B29C 33/06 219/601 |
| 2008/0230957 | A1 | * | 9/2008 | Feigenblum | B29C 33/06 264/401 |
| 2010/0201040 | A1 | * | 8/2010 | Guichard | B29C 35/0805 264/403 |

\* cited by examiner

DEVICE FOR ADJUSTING THE QUALITY FACTOR OF A MOLD WITH A SELF-CONTAINED INDUCTION HEATING SYSTEM

RELATED APPLICATIONS

This application is a §371 application from PCT/EP2012/065734 filed Aug. 10, 2012, which claims priority from French Patent Application No. 1157289 filed Aug. 10, 2011, each of which is herein incorporated by reference in its entirety.

TECHNICAL FIELD OF THE INVENTION

The invention relates to a device for adjusting the quality factor of a mold with a self-contained induction heating system.

BACKGROUND OF THE INVENTION

In a known embodiment of the prior art, described for example in the document EP 1 894 442, a mold with a self-contained heating system includes two mold bodies that define the forming cavity. Such a mold may be used for stamping operations or for hot molding operations. At least one of the mold bodies comprises a self-contained heating system using inductors. According to this exemplary embodiment of the prior art, the inductors are made up of electrical conductors extending in grooves or bores, forming closed cavities made in the mold body, which grooves or bores define the paths of the inductors. The paths of the inductors as well as their number and distribution in the mold body are determined by the shape of the cavity demarcating the molding recess made in said mold body, by the temperature to reach within that cavity and the distribution of temperature sought in said cavity during the stamping or molding cycle. Part of the mold body is made up of ferromagnetic material that is subjected to the effect of the inductors. This part of the mold body may be the entire mold, only a part of its volume, such as the part of the mold body in which the grooves or bores are made, or limited to the internal coating of the grooves or bores in which the inductors are located. Said mold is installed in a production environment, for example on the platens of a press. It is then connected to a high-frequency current generator available in the market. Said generator is connected to the inductors and heating is achieved by passing high-frequency alternating electric current in said inductors, which generates induced currents leading to the heating of the ferromagnetic part of the mold, which heats and transmits the heat by conduction to the cavity and finally to the material making up the future part made using the mold.

A high-frequency current generator operates by bringing into resonance the oscillating circuit made up of the inductor and the load heated by it. These conditions allow optimal inductive efficiency. When this condition is not fulfilled, the energy dispensed by the generator is consumed by Joule effect in the conductors that make up the inductors, said effect leading to no heating or too little heating of the ferromagnetic part. Thus, that lack of energy efficiency subjects the inductors to significant thermal stresses in view of the efficiency of the heating of the mold.

The document U.S. Pat. No. 1,948,704 describes an induction heating device suitable for the thermal treatment of material that is directly subjected to induction. For example, that device is suitable for the thermal treatment of a spring or for melting metal. The material heated by induction in this way is placed in an induction coil with known characteristics. The working conditions of the generator are adapted to the device, so that the coil and generator assembly makes up a resonant circuit. The introduction of the load in the circuit and the modification during the thermal treatment of the characteristics of the treated material by the fusion of the material or its being heated beyond the Curie point are liable to make the operating conditions of the device differ from the optimum conditions. Thus, the device disclosed in this document of the prior art comprises variable capacitances and inductances to adapt the response of the generator and try to always remain at the optimal conditions.

In the case of a tool with self-contained heating, the oscillating circuit, the shape of which is imposed by different technical constraints, is generally not resonant. Thus, when such a tool is connected to the high-frequency generator, in many cases, the generator can simply not start.

FIG. 1 of the prior art shows a schematic electric circuit of a self-contained induction heating device. The tooling circuit (120), corresponding to the inductors of the mold body interacting with said tooling is characterized by impedance Z1, combining the equivalent electrical resistances (105) and inductances (115) of the mold body and the inductors, R1 and L1. Also according to the prior art, a capacitor box (101) with adjustable capacitance C3 is connected to the generator (100) in parallel with the tooling circuit (120). The high-frequency electrical generator (100), characterized by impedance ZG, is placed in parallel in that circuit for powering it. The generator is adapted to supply alternating current within a set frequency range, generally located between 10 kHz and 100 kHz. The so-called load circuit made up by the tooling circuit and the capacitor box forms an oscillating circuit of the parallel type. To power said circuit, in optimal conditions, the power source comprises an electronic circuit that allows it to adjust itself automatically to the resonance frequency of the oscillating circuit.

As with any resonance phenomenon, it is characterized by a resonance frequency f0 and by a resonance peak width Δf, when it exists. The frequency f0 of the oscillating circuit resonance is given by the relationship:

$$L1.C3.\omega_0^2=1, \text{ where } \omega_0=2\pi f0$$

and the peak width is a function of the ratio L1/R1. The larger the value L1/R1, the narrower the resonance peak.

Thus, one condition for the generator starting up is that it is able to adjust to the resonance frequency of the oscillating circuit, that is to say that the resonance frequency is sufficiently marked by a narrow resonance peak and that the resonance frequency is located between the supply frequency range that said generator is capable of delivering. To that end, a quality factor $Q=L1\ \omega_0/R1$ is defined. For the resonance peak to be marked and for the generator to be able to detect the resonance frequency of the oscillating circuit and adjust to it, it is necessary for that quality factor Q to be greater than or equal to 2. However, in most cases, said quality factor is substantially smaller than 1, so that the generator does not start and the adjustment of the capacitor C3 does not make it possible to modify the quality factor Q.

Besides, the power delivered by the generator and injected in the tooling circuit is maximal when the load impedance is in the output impedance range of the generator, or:

$$Z1 \sim ZG$$

But the values of R1 and L1 are chiefly determined by the geometry of the cavity and the technical constraints of temperature distribution in said cavity, so they only provide a small adjustment latitude.

OBJECT AND SUMMARY OF THE INVENTION

In order to remedy the drawbacks of the prior art, the invention relates to a mold comprising a self-contained heating device, said mold comprising:
a. a mold body comprising an induction heating circuit, referred to as an tooling circuit, having a resistance R1 and an inductance L1, said tooling circuit including an inductor extending inside a closed cavity of the mold body;
b. connection means for connecting the tooling circuit to a high-frequency current generator;
c. said mold includes a so-called adjustment coil having a resistance R2 and an inductance L2 that does not induce current in the mold body and is connected to the tooling circuit, between said tooling circuit and the connection means.

The insertion of an additional coil in the heating circuit offers additional adjustment latitude. Because said coil does not interact with the load, its geometry (length, number of turns) is determined by the inductance L2 to reach, with no effect on the heating distribution in the mold body, as the resistance R2 is besides small. Thus, the presence of the coil makes it possible to adjust the quality factor Q of the tooling circuit and make it resonant. Said adjustment coil is associated with the mold and is calculated on the basis of the mold so that said mold can be connected and can work with any commercial generator. The working of the self-contained heating device of said mold thus becomes independent of the production environment.

The invention can be implemented in the advantageous embodiments described below, which can be considered individually or in any technically operative combination.

In a first alternative of the mold according to the invention, the adjustment coil is connected electrically in series with the tooling circuit.

In a second alternative of the mold according to the invention, the adjustment coil is connected electrically in parallel with the tooling circuit.

Thus, depending on the mode of connection of the adjustment coil, its inductance and resistance can be combined differently to achieve the desired result.

Advantageously, the resulting inductance and resistance of the tooling circuit combined with the adjustment coil are such that the quality factor Q of the oscillating electrical circuit formed, when said tooling circuit connected to the coil is connected to a high-frequency current generator, is located between 2 and 5. Thus, the quality factor is high enough to allow the generator to start up without difficulty, but is limited to avoid excessive heating of the inductors, particularly when they are not cooled during operation.

In one advantageous embodiment of the mold according to the invention, the tooling circuit comprises two inductors connected in parallel, and the adjustment coil is connected in series with one of the inductors. Thus, in addition to the effect of said coil on the adjustment of the quality factor, it also makes it possible to adjust the sharing of the current intensity between the two inductors. The use of two or more inductors makes it possible to better distribute the heating between the parts of the mold, more particularly when, in a particular embodiment, the mold according to the invention comprises two mold bodies and each of the two inductors extends in a different mold body.

In that last embodiment, the mold according to the invention comprises electrical connection means adapted to make a connection between the inductors of the two mold bodies when said mold bodies are brought closer to each other. Thus, it is possible to arrange a wide opening position between the punch and the die, for example to insert a blank to be stamped, without placing a great length of connection cables between the two shapes.

Advantageously, regardless of the embodiment of the mold according to the invention, the electrical tooling circuit comprises two inductors connected in series. Thus, the induction heating effect can be better distributed over the surface of the stamping shape, and serial connection makes it possible to ensure that the same intensity passes through the two inductors. The presence of the adjustment coil makes it possible to compensate for the degradation of the quality factor due to the great length of the inductor.

BRIEF DESCRIPTION OF THE DRAWINGS

The invention is described below in its preferred embodiments, which are not limitative in any way, and by reference to FIGS. 1 to 5, in which.

DETAILED DESCRIPTION OF THE EMBODIMENTS

Figure 2:
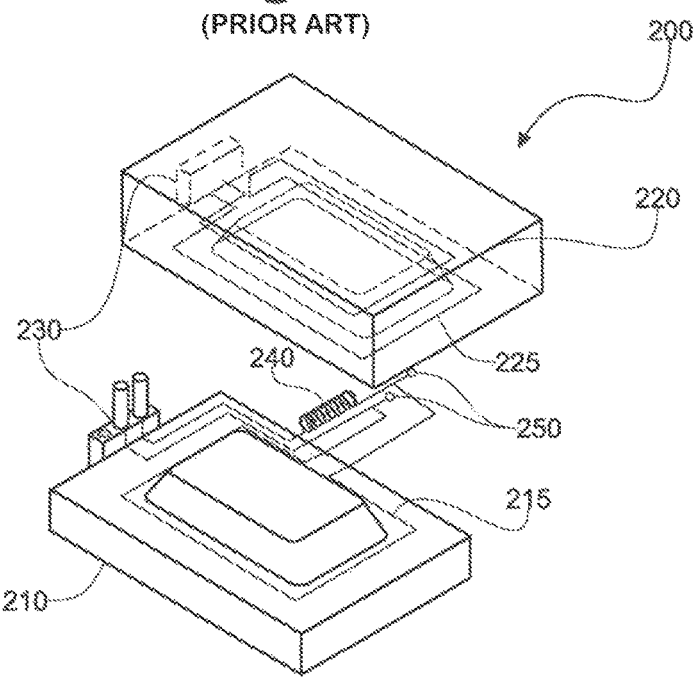
FIG. 2 represents a perspective front and top view of an exemplary embodiment of a mold according to the invention comprising a punch and a die.

In FIG. 2, in one exemplary embodiment of the mold according to the invention, the mold includes a first (210) mold body comprising a male part forming a punch and a second (220) mold body comprising a female part forming the die. Each of the two mold bodies comprises an electrical induction circuit (215, 225) formed by conductors that make up substantially one turn in the volume of said tool. According to this exemplary embodiment, the punch (210) comprises an inductor (215) and the die (220) comprises two inductors (225) connected in series. Each of these inductors (215, 225) interacts with the mold body in which it extends, by creating induced currents therein. In one exemplary embodiment, said mold (200) is made up of a ferromagnetic material so that these induced currents heat said mold to rapidly raise its temperature to a temperature suitable for transforming the material formed between the punch (210) and the die (220). Also in this exemplary embodiment, the die (220) and the punch (210) comprise connection means (230) so that when said die (220) is brought closer to the punch, the inductors (225) of the die (220) are connected electrically and in parallel with the inductor (215) of the punch (210) and together form an inductive circuit, which is connected to a high-frequency generator (not shown) by appropriate connection means (250). A so-called adjustment coil (240), which does not interact with the tool, is advantageously placed in the electrical circuit thus formed between said connection means (250) and the tooling circuit. That adjustment coil (240) is made of a material that is a good conductor of electricity such as copper, and is designed, in terms of diameter and number of turns, to have an inductance L2 such that the electrical circuit thus constituted meets the energy efficiency and generator starting conditions.

Figure 1:
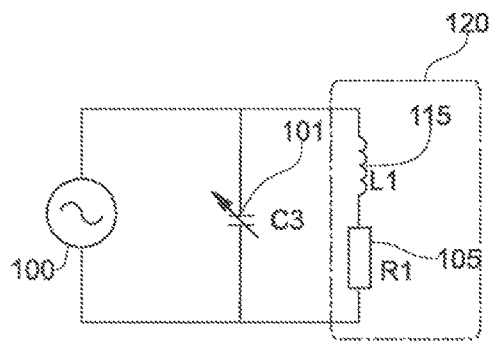
FIG. 1 relating to the prior art illustrates the electrical assembly corresponding to a mold with a self-contained induction heating device when it is connected to a high-frequency current generator.

To go back to FIG. 1 relating to the prior art, the induction heating device comprises an inductor with inductance Li and ohmic resistance Ri, which inductor interacts with the load, made up by the mold body, which load has resistance Rch and inductance Lch. The combination of the characteristics of the load and the inductor defines the characteristics of the electrical circuit, called the tooling circuit (120), which is connected to a high-frequency generator (100). A capacitor box (101) with adjustable capacitance is connected in parallel to that tooling circuit, and the value of the capacitance is set to C3 in this example. The assembly bringing together the capacitor and the tooling circuit defines the oscillating circuit connected to the generator (100). That oscillating circuit is characterized by its impedance Z1, dependent upon its resulting characteristics of resistance R1, inductance L1 and capacitance C3. Thus:

$$Z1=L1/(C3.R1)$$

where C3 is the value to which the capacitance (101) of the adjustable capacitor box is set. The resulting inductance (115) of the oscillating circuit is defined by:

$$L1=Li-Lch$$

The major contribution comes from the inductor.
The resulting resistance (105) is defined by:

$$R1=Ri+Rch$$

The major contribution comes from the load resistance.
The longer the inductor, the greater the resulting inductance (115), L1. That parameter is thus greatly influenced by the geometry of the device, and the resistance (105) R1 will be chiefly influenced by the nature of the load and its mass.

In the example as represented in FIG. 2, the geometry is constrained by functional factors relating to the shape of the mold and the distribution of the temperatures sought in the cavities. Thus, the verification of the conditions $L1.C1.\omega_0^2=1$, $L1.\omega_0/R1 \geq 2$ and $Z1 \sim ZG$ or $ZG$ where $ZG$ is the impedance of the generator (100) are difficult to meet.

Figure 3:
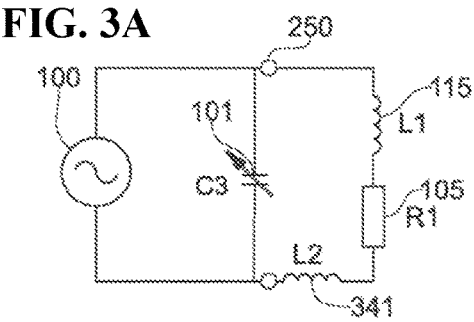
FIG. 3 shows equivalent electrical circuits of a mold according to exemplary embodiments of the invention when the mold is connected to a high-frequency alternating current generator, in FIGS. 2B and 2C, according to exemplary embodiments of the invention.
Figure 3:
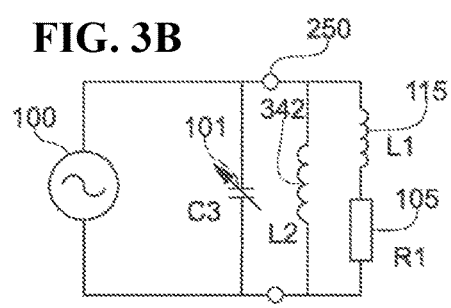

In FIGS. 3A and 3B, the introduction of an additional inductance (341, 342) in the circuit, between the connection terminals (250) and the tooling circuit, which inductance is connected either in series (341) in FIG. 3A or in parallel (342) in FIG. 2C, with said tooling circuit, makes it possible to adjust the characteristics of the oscillating circuit so that the conditions are verified, and to thus allow the generator to start up and the device to operate in optimal energy efficiency conditions.

Going back to FIG. 2, the adjustment coil (240), which is made of copper, has a very small ohmic resistance so that when said coil is connected in series its resistance can be neglected and R2=0 in practice for such connection in series. If the adjustment coil (240) is connected in parallel with the oscillating circuit, the low resistance of R2 has an important effect on the resonance characteristics of the oscillating circuit and particularly on the width of the resonance peak, that is to say the quality factor Q.

Thus, in FIG. 3A, in the case of serial assembly, the resistance Rc of the circuit is given by R1, where R1 is essentially the resistance of the load and the inductance of the circuit LC is given by the combination (L1+L2). Thus, by increasing the value of the inductance by the inductance L2 of the adjustment coil (341), the quality factor Q is increased, and the adaptation of the impedance and frequency in relation to the characteristics of the generator (100) is brought about by modifying the value of the capacitance (101), that is to say without modifying the mold, supplied with its adjustment coil.

In FIG. 3B, if the adjustment coil (342) is connected in parallel, the inductance of the circuit Lc will be given by the relationship:

$$Lc=L1.L2/(L1+L2)$$

Thus, whether the adjustment coil is in a configuration with serial connection (341) or a parallel connection (342) in the oscillating circuit, it makes it possible, by adjusting its inductance L2, not inducing current in the load, and its low resistance R2, to achieve a quality factor Q that is appropriate for starting up a high-frequency generator. Thus, the tooling circuit is determined on the basis of the geometry of the cavities, the temperature distribution to be obtained in them, and the mass of the tool, without having to take account of the possibility of starting up the generator supplying power to said mold, and without taking account of the energy efficiency of the heating in the presence of the generator. The adjustment coil is then calculated on the basis of the tooling circuit to make it resonant. Advantageously, several adjustment coils combining serial and parallel connections with the tooling circuit allow the fine adjustment of the operating parameters of the self-contained heating mold. Thus, the use of such an adjustment coil offers high latitude in the designing of the mold and makes it possible to make a mold where the heating distribution on the surface of the cavity is optimal, leading to a better quality of the molded parts.

Figure 4:
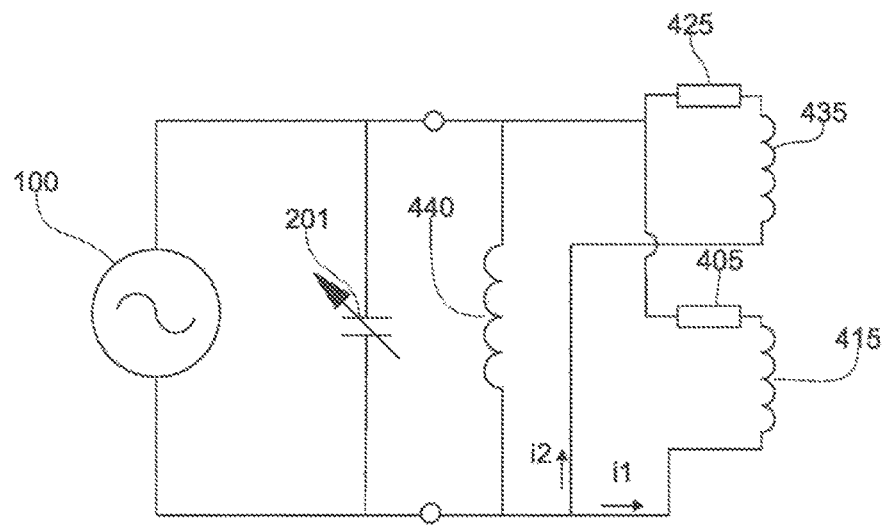
FIG. 4 is an electrical diagram of an exemplary embodiment of the mold in the invention comprising two parallel induction circuits.

In FIG. 4, according to another exemplary embodiment of the mold in the invention, a first inductive circuit, characterized by its equivalent resistance (405) and inductance (415), is connected to the generator (100). As a non-limitative example, that first inductive circuit is used for heating the punch. A current i1 flows through that first circuit. A second inductive circuit, characterized by its equivalent resistance (425) and inductance (435), is for example used to heat the die of the mold. That second inductive circuit is connected to the generator (100) in parallel with the first inductive circuit and a current i2 flows through it. If the characteristics of the two induction circuits are similar, that is to say the length of their inductors and induction heated volumes are substantially equivalent in the two circuits, then:

$$i1=i2 \text{ and } i1+i2=Q.i$$

where i is the current delivered by the generator and Q is the quality factor of the oscillating circuit. In such a configuration, the insertion of an adjustment coil (440) in the circuit makes it possible to obtain both a quality factor appropriate for favoring the starting up of the generator (100), that is to say a factor Q at least equal to 2, and to maintain that factor Q close to the minimum to avoid having to pass a current with excessively high intensity in the inductors (415, 435).

Figure 5:
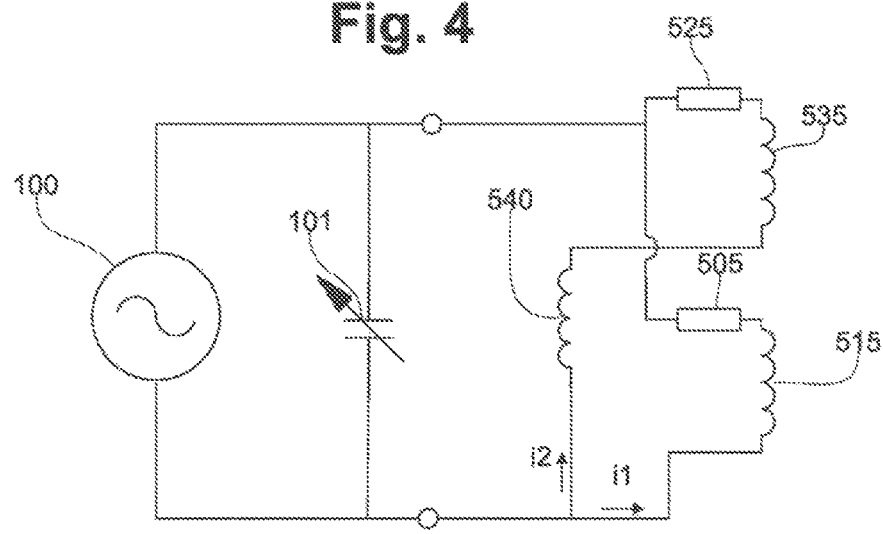
FIG. 5 represents the electrical diagram of a mold in an exemplary embodiment of the invention comprising two inductors connected in parallel and a coil connected in series with one of the two inductors.

In FIG. 5, in one exemplary embodiment, the mold in the invention comprises two parallel inductive circuits with equivalent resistances (505, 525) or very different inductances (515, 535). These different equivalent impedances could come, for example, from the different lengths of the inductors used to heat the punch and the die or the differences in the volumes heated of each inductive circuit. Thus, in the absence of other elements, the electric current generated by the generator (100) is distributed between these two circuits depending on their respective impedances so that the stronger current flows through the circuit with the lower impedance, thus that in principle with the lower volume of material to heat. The use of an adjustment coil (540), in addition to the effect described above, also makes it possible in this case to adjust that distribution of current between the two inductive circuits so that the current i1 flowing in the first circuit and the current i2 flowing in the second circuit produce heating effects that are appropriate for the application sought depending on the characteristics of the load.

In resonance conditions, the intensity flowing in the inductor is multiple depending on a factor Q of the intensity produced by the generator. Thus, it is of use to act on the characteristics of the adjustment coils in order to ensure a minimum value of the quality factor Q to allow the generator to start up, and also to set the maximum value of that quality factor, so that the intensity flowing through the inductors does not risk damaging them by their own heating.

The description and the exemplary embodiments above show that the invention achieves the objectives sought, in particular, it makes it possible to adjust the characteristics of the tooling circuit of a mold with self-contained heating so that the oscillating circuit formed when said tooling circuit is connected to a high-frequency generator is adapted to the starting of said generator and makes it possible to reach energy efficiency such that the factor Q is greater than 2. The use of an adjustment coil connected between the tooling circuit and the connection terminals of the tooling circuit, therefore attached to the tool, makes it possible to transfer the tool from one production environment to another.

The invention claimed is:

1. A mold with a self-contained heating device, comprising:
   a mold body comprising a tooling circuit having a resistance R1 and an inductance L1, the tooling circuit comprising an inductor extending inside a closed cavity of the mold body;
   a connector to connect the tooling circuit to a high-frequency current generator;
   an adjustment coil having a resistance R2 and an inductance L2 that does not induce current in the mold body, the adjustment coil is connected to the tooling circuit, between the tooling circuit and the connector, the inductance and the resistance of the tooling circuit are combined with the inductance and the resistance of the adjustment coil to adjust operating parameters of the mold with the self-contained heating device and to form an oscillating electrical circuit with a resonance frequency $f0=\omega_0/2\pi$, wherein a quality factor Q of the oscillating electrical circuit formed when the tooling circuit connected to the adjustment coil is connected to a high-frequency current generator is a number between 2 and 5, where $Q=L1\ \omega_0/R1$.

2. The mold according to claim 1, wherein the adjustment coil is connected electrically in series with the tooling circuit.

3. The mold according to claim 1, wherein the adjustment coil is connected electrically in parallel with the tooling circuit.

4. The mold according to claim 1, wherein the tooling circuit comprises two inductors connected in parallel; and wherein the adjustment coil is connected in series with one of the inductors.

5. The mold according to claim 4, further comprising two mold bodies and each of the two inductors extends in a different mold body.

6. The mold according to claim 5, further comprising electrical connectors configured to make a connection between the inductors of the two mold bodies when the mold bodies are brought closer to each other.

7. The mold according to claim 1, wherein the tooling circuit comprises two inductors connected in series.

* * * * *